United States Patent [19]
Mitchell

[11] Patent Number: 5,207,443
[45] Date of Patent: May 4, 1993

[54] MULTIPLE AXLE TRAILERS

[76] Inventor: George W. Mitchell, Foss Farm, Wilberfoss, York, North Yorkshire, United Kingdom, YO4 5NY

[21] Appl. No.: 602,268
[22] PCT Filed: Mar. 5, 1989
[86] PCT No.: PCT/GB89/00465
§ 371 Date: Nov. 8, 1990
§ 102(e) Date: Nov. 8, 1990
[87] PCT Pub. No.: WO89/10866
PCT Pub. Date: Nov. 16, 1989

[30] Foreign Application Priority Data
May 12, 1988 [GB] United Kingdom ............... 8811247
Jul. 23, 1988 [GB] United Kingdom ............... 8817612

[51] Int. Cl.$^5$ .................... B62D 13/02; B62D 13/06
[52] U.S. Cl. .................... 280/426; 280/81.6; 280/98; 280/432; 280/442
[58] Field of Search ........... 280/408, 426, 442, 433, 280/432, 81.5, 81.6, 86, 95.1, 98

[56] References Cited
U.S. PATENT DOCUMENTS
3,291,503 12/1966 DeLay ........................... 280/81.6
3,448,999 6/1969 Kollander et al. ............. 280/426
4,369,983 1/1983 Charek ........................... 280/81.6

FOREIGN PATENT DOCUMENTS
1249711 9/1967 Fed. Rep. of Germany ..... 280/81.6
2455995 8/1976 Fed. Rep. of Germany ..... 280/81.6
2512411 9/1981 France .
8910866 11/1989 PCT Int'l Appl. ................ 280/442
1170712 11/1969 United Kingdom ............... 280/81.6

Primary Examiner—Mitchell J. Hill
Attorney, Agent, or Firm—Stevens, Davis, Miller & Mosher

[57] ABSTRACT

A multiple axle trailer comprises a chassis pivotally connected to turn substantially horizontally with respect to a sub-chassis and provided with means at its forward end to enable the trailer to be hitched to a towing vehicle, the sub-chassis carrying forward and rear pairs of wheels. An adjustable length steering arm is pivotally connected to the sub-chassis and to the chassis forward of the connection to the sub-chassis. A system of linkages connects the forward wheel king pins with a mounting point which is rotationally fixed with respect to the steering arm and operates to turn the forward wheels from the steering arm so that the trailer tracks the towing vehicle. In a preferred embodiment the mounting point is moveable longitudinally to enable the forward wheels to be moved in the opposite direction during reversing of the trailer.

14 Claims, 5 Drawing Sheets

MULTIPLE AXLE TRAILERS

BACKGROUND OF THE INVENTION

The present invention relates to a multiple axle trailer and particularly to the steerage thereof.

In order to minimize wear and tear on tyres and chassis stress it is advantageous that the trailer wheels properly follow the wheels of the towing vehicle, be it lorry cab or tractor. To achieve this it is usually necessary that successive pairs of wheels take up slightly different positions and angles under the chassis.

Existing steering systems for trailers use the bogie system for steering by means of which both wheels of a pair are turned simultaneously by altering the angle of the axle which connects the wheels together or allowing the rear axle wheels to pivot.

SUMMARY OF THE INVENTION

According to the present invention there is provided a multiple axle trailer comprising
a sub-chassis fitted with at least first and second axles,
a chassis supported on the sub-chassis to pivot relative to the sub-chassis and provided with means at its forward end to enable the trailer to be pivoted to a towing vehicle, a pair of wheels on the first axle able to turn with respect to the first axle,
characterized in that there is provided
a steering arm pivotally connected to the sub-chassis at a first pivot, and to the chassis at a second pivot, and adapted to pivot relative to the sub-chassis when the chassis is caused to pivot relative to the sub-chassis, the length of the steering arm being adjustable to cater to changes in the distance between the first and second pivots during operation;
a mounting point movable with the steering arm,
a respective pivot point associated with each of the first wheels,
and a system of linkages connected between each of the wheel pivot points and the mounting point, the linkages being operable to steer the wheels of the first axle in response to the pivotal position of the steering arm relative to the sub-chassis.

The actual path taken by the trailer will depend on the geometry of the steering arms.

Thus rather than taking the line of least resistance, as was the case in the prior art, the steered wheels are actively brought to the optimum position for following the towing vehicle.

Advantageously the sub-chassis comprises the lower part of a turntable and the chassis includes the upper part of the turn table, the pivot point connecting the two parts of the turntable being located substantially centrally over the axles.

The linkages may include a track arm and a track rod for each wheel of the first pair, each track rod having a first end pivotally mounted to the said mounting point and a second end pivotally mounted to its respective track arm.

Preferably the lower part of the turntable is in the form of a square or rhombus with two opposed corners directed longitudinally of the trailer.

In one embodiment the mounting point is moveable longitudinally of the steering arm between a position in front of an imaginary line joining the track rod second ends and a position behind the said imaginary line.

The adjustment of the position of the track rod mounting points in this way alters the direction that the wheels will turn in response to an angular movement of the steering arm. For forward motion the front wheels will be turned to track the towing vehicle while for the same angular movement when the vehicle is in reverse the wheels will be turned the opposite way to steer the towing vehicle making reversing as easy as a fixed axle.

BRIEF DESCRIPTION OF THE DRAWINGS

The invention will now be described by way of example with reference to the accompanying drawings in which.

DETAILED DESCRIPTION OF A PREFERRED EMBODIMENT

Figure 1:
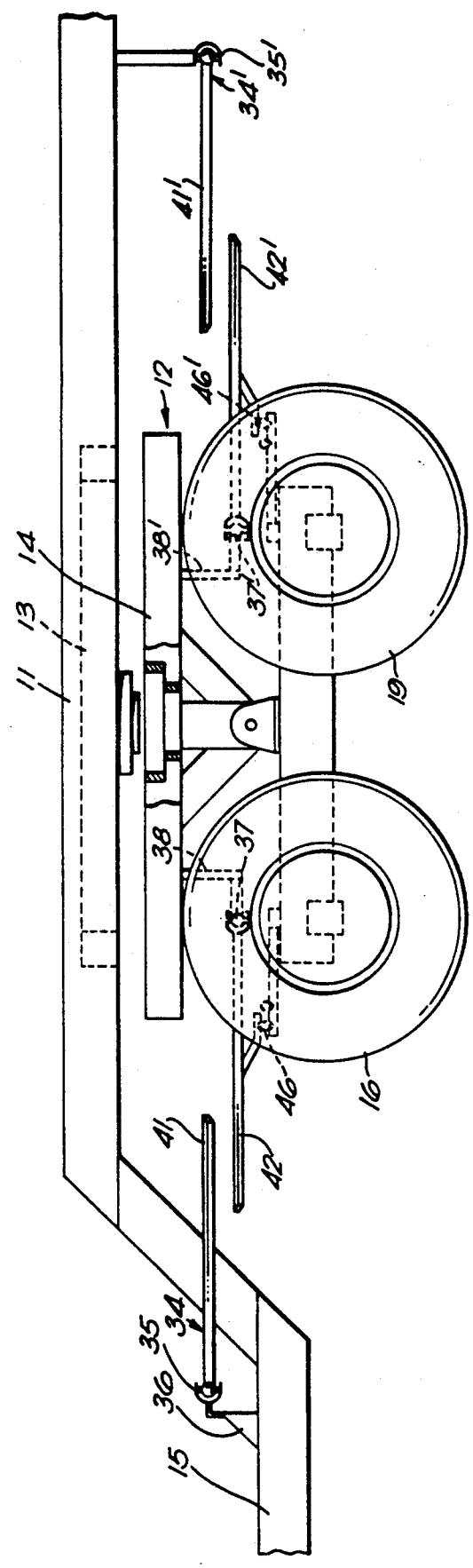
FIG. 1 is a diagrammatic side view partially in section of a trailer according to the invention with the chassis lifted off the sub-chassis to show the connection.
Figure 2:
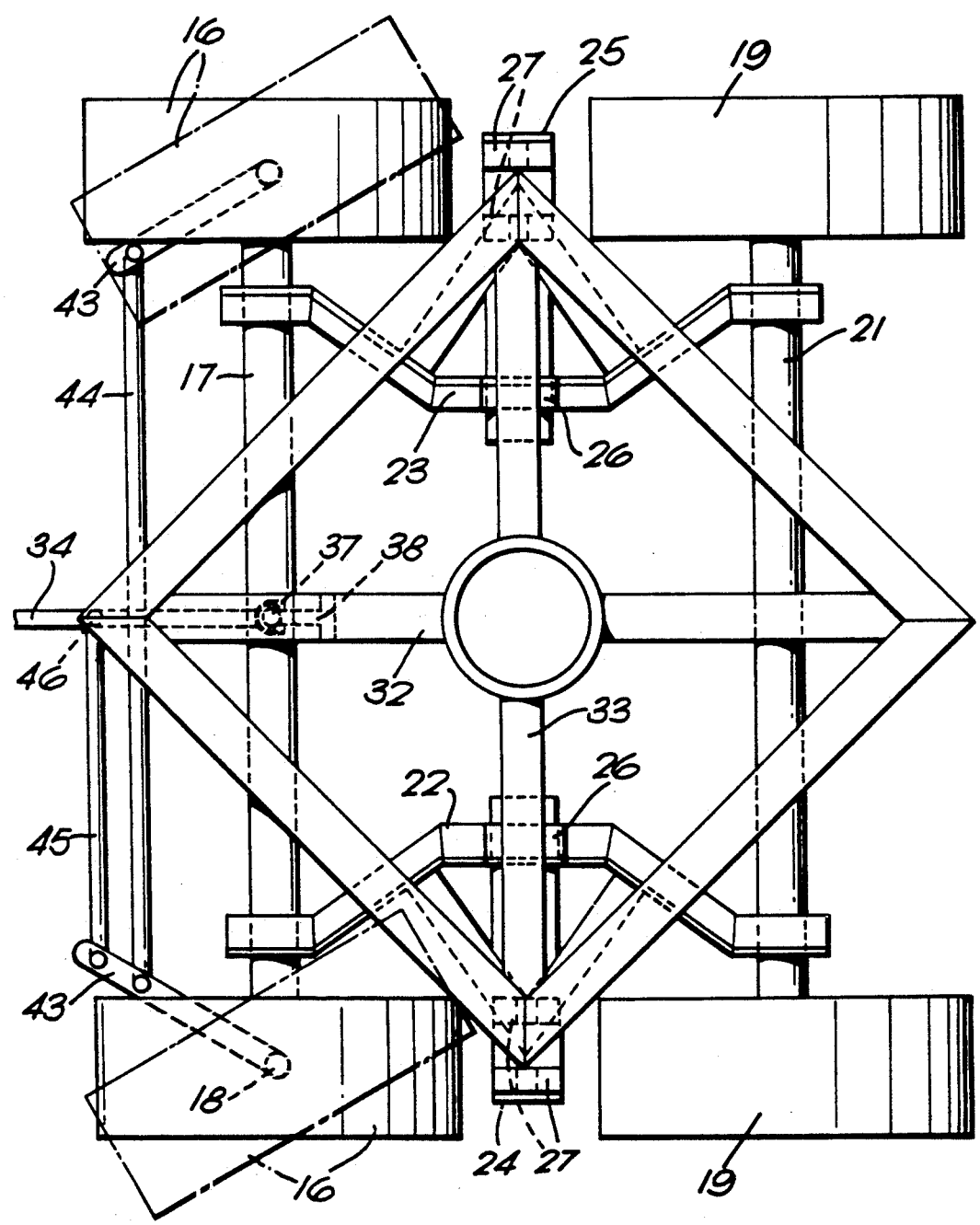
FIG. 2 is a diagrammatic plan view of the sub-chassis of the trailer of FIG. 1.
Figure 3:
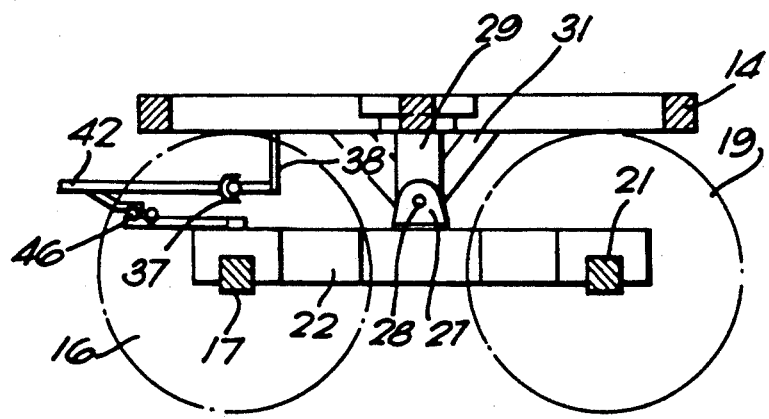
FIG. 3 is a diagrammatic longitudinal section of the sub-chassis of FIG. 1.
Figure 4:
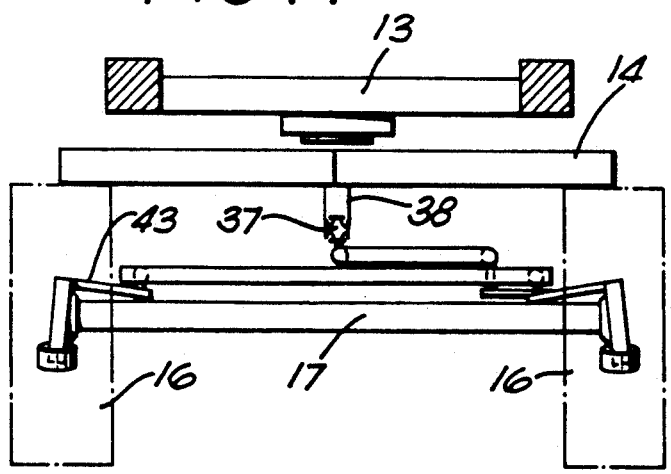
FIG. 4 is a diagrammatic front view of the sub-chassis of FIG. 1 showing the arrangement of linkages.

The illustrated trailer comprises a chassis 11 and a sub-chassis 12 pivotally mounted one to the other to turn about a substantially vertical axis by a turntable the upper section 13 of which is housed between the outer beams of the chassis 11 and the lower section of which is in the form of a frame 14 and forms part of the sub-chassis. The pivotal mounting itself can be of any appropriate type to be smooth operating and strong. The trailer chassis has at its front end a drawing link 15 by means of which it can be attached to a towing vehicle.

The sub-chassis 12 which bears the weight of the trailer carries two pairs of wheels, a forward pair 16 joined together by an axle 17 and connected via respective king pins 18 acting as pivot points to turn with respect to the sub-chassis 12; and a rear pair of wheels 19 joined together by an axle 21. The wheels 16,19 on each side of the sub-chassis are connected to one another by respective left/right walking axles 22,23. The axles 22,23 which are shaped to avoid interference with the turning wheels 16, connect the axles 17,21 to a respective support beam 24,25 via respective pivotal mountings 26. The support beams 24,25 each carry brackets 27 outward of the mounting 26 by means of which brackets a pivotal mounting 28 is made with the sides of the frame 14 via respective main supporting struts 29 and two balancing arms 31. All the weight of the trailer is carried at these mounting points 28. The frame 14, which is supported just above the wheels, is shaped as a square or rhombus so as to avoid contact with the wheels. A circular or polygonal frame may in some circumstances be more appropriate, particularly for trailers with more than two axles. Two opposed corners central of the sub-chassis with the diagonal beam 32 connecting them run longitudinally of the trailer and the other two corners, connected together by the transverse beam 33, have the struts 29 and the arms 31 attached thereto. The shape of the frame 14 is designed to allow space for the wheels and any other shape which achieves this would be satisfactory.

The front wheels 16 are turned with respect to the sub-chassis as the towing vehicle turns by means of a steering arm 34 and a system of linkages. The steering arm is connected at one end to the drawing link 15 through a universal joint 35 connected to a bracket 36 on the link 15. At its other end the steering arm 34 is connected via a universal joint 37 to a drop arm 38 fixed to the underside of the beam 32 of the frame 14 at a position substantially mid-way between the front corner and the centre of the frame 14.

On turning a corner, the upper part of the turn table and the towing link automatically turn with the change of direction of the towing vehicle. Because of the resistance of the wheels on the ground this will cause the upper section of the turntable to pivot on the lower section. As a result of this relative pivotal movement between the upper and lower sections of the turntable, the distance between the pivot points at the extreme ends of the steering arm changes. To take account of this, either the steering arm may be formed telescopically or side by side in two or more parts so that it can extend and contract as required; or one of the ends of the steering arm may include a slide-and-pin pivot to take up the extra movement.

The former arrangement is currently preferred as it is then possible to connect the steering arm to the towing link using a universal joint, which improves the steering. The illustrated trailer shows a telescopic arrangement with the slideably co-operating parts 41, 42.

In the embodiment illustrated in FIGS. 1 to 4 the forward wheels only are steerable directly from the towing link. The rear wheels are fixed angularly with respect to the sub-chassis. However as the lower part of the turntable pivots with respect to the upper part, the rear wheels will turn to take up a position opposed in direction to that taken up by the forward wheels so that a very reasonable turning circle is achieved. The forward wheels 16 are rotated on their respective king pins 18 automatically by means of a linkage system taken from the steering arm 34 from a position at the front of the sub-chassis 14. Each forward wheel 16 is connected to a respective track arm 43, the track arms 43 being pivotally interconnected by a track rod 44. The angular movement of the steering arm 34 is transferred into a turning of the forward wheels 16 by a drag link 45 pivotally connected between the left wheel track arm 43 and to a knuckle joint 46 on the steering arm positioned under the front end of the frame 14. It is this joint 46 that forms the mounting point of claim 1.

With a distance between the two universal joints 35,37 when the trailer is square on the sub chassis equal to approximately one third of the length of the trailer, a 36 degree turn of the chassis results in a 24 degree turn of the wheels 16. By adjusting the position of the bracket 36 and/or the fixing point of the drop arm 38 on the frame 14, the relative turning angles of the chassis and wheels 16 can be varied.

Figure 8:
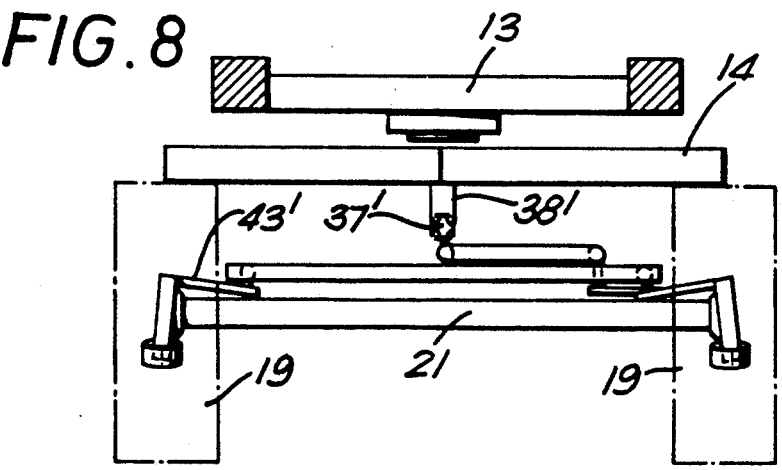
FIG. 8 is a diagrammatic view similar to FIG. 4, but showing a rear view of the sub-chassis.

The rear wheels can also be steered if required to take up an orientation either the same as or opposed to that of the forward wheels. This is shown in FIG. 8 which is a diagrammatic view similar to FIG. 4 but showing a rear view of the sub-chassis; in it, parts which compare to those of the front wheels are shown with prime numbers. This may be achieved by a system of linkages identical to those used on the forward wheels from a steering arm pivotally mounted between a drop arm 43' under the rear half of the frame 14 and the back end of the chassis 11. The connection between a rear drag link 45' and the steering arm will need to be adjustable and for example a sliding joint may be used.

The connections between the walking axles 22,23 and the axles 17,21 may be via rubber bushes. The bearings on the stearing arm need to be well fitting to maximize the accuracy of the steering. The mounting between the two sections of the turntable may include nylon (RTM) or other low friction bearings.

The operation of the steering system is similar to that used on automobiles. The turning of the trailer chassis causes the upper turntable section to turn on the lower section. For a left turn this will result in a contraction of the steering arm and an angular movement of the steering arm. The movement of the steering arm will push the drag link 45, which in turn will push the left track arm 43 to adjust the angle of the wheel. The angular movement of the left track arm is transferred to the right track arm by means of the track rod 44.

Thus with a very simple system of linkages the forward (or rear) wheels can be steered automatically from the alteration in direction of the front end of the trailer.

To provide suspension the sub-chassis sections may be pivoted about a transverse horizontal axis as described above, or alternatively sprung. It may be sprung either using coil springs, or one or more leaf springs, or a single spring mounted transversely along each axle. A tie bar is required with a spring suspension.

The steering system is equally appropriate for agricultural and road haulage trailers and for twin or triple axle trailers. A twin axle trailer is described above.

Figure 5:
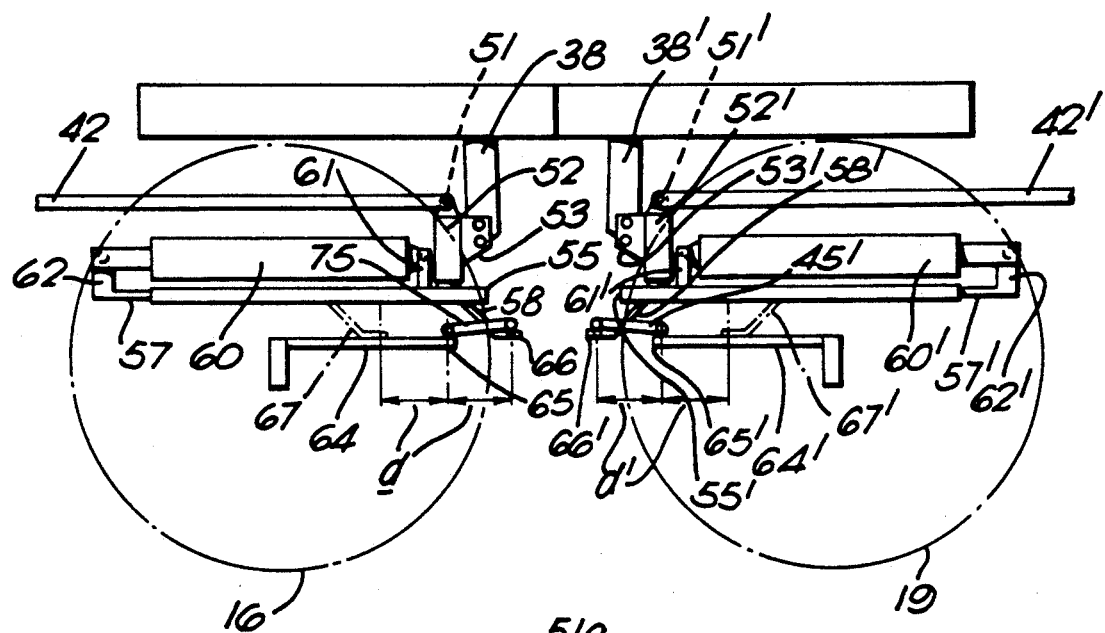
FIG. 5 is a diagrammatic side view of a second embodiment of the invention.
Figure 7:
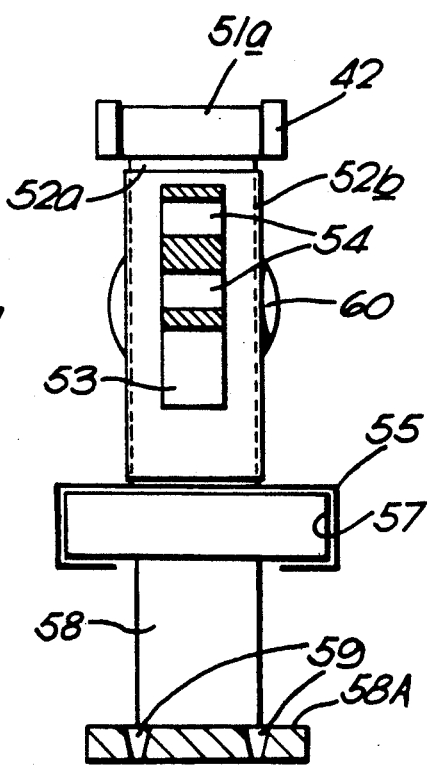
FIG. 7 is a cross section through A—A of the forward/reverse steering mechanism of FIG. 6.
Figure 6:
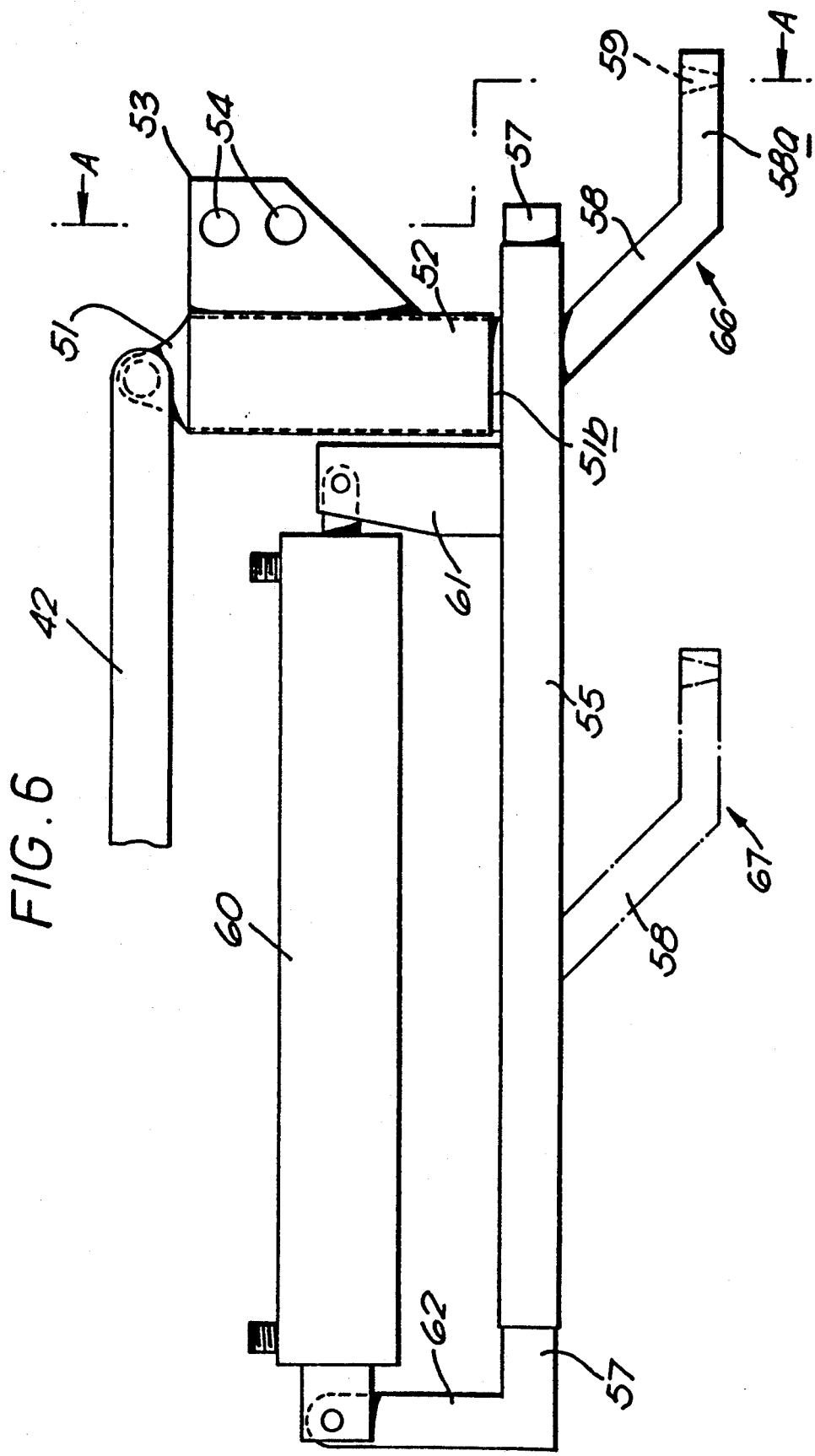
FIG. 6 is an enlarged view of part of FIG. 5

FIGS. 5 to 7 illustrate a modification of the above design which is an improvement in that it operates equally well when the vehicle is being reversed. The mechanisms are the same with regard to the connection of the steering arm at the front of the trailer and to the front wheel king pins, stub axles, track arms etc, the modification being accommodated between the steering arm and track arms as to be defined hereinafter.

The universal joint 37 of the mechanism of FIG. 1 is replaced by a horizontal axis hinge 51 and a vertical axis hinge 52. The horizontal axis hinge 51 is formed by a central portion 51a to which the steering arm 42 is pivoted at each side. The central portion 51a is integral with a pin 52a which pin is freely pivoted within a casing 52b to form the hinge 52. The casing 52b is integral with a bracket 53 having two apertures 54 by means of which the bracket can be mounted to the drop arm 38.

The bottom end of the pin 52a is welded or otherwise fixedly connected to a channel section member 55 the angle of which is altered simultaneously with the steering arm 42 parallel thereto. The channel section member 55, which opens downwardly, carries slideably mounted therein a track rod carrier 57 having an arm 58 which extends downwardly through the channel opening towards the rear end of the carrier. At the lower end of the arm 58 there is a horizontal portion 58a which is provided with two mounting apertures 59 to which respective track rod parts 75 are fitted and which forms the mounting point of claim 1. The sliding movement of the carrier 57 in the channel member 55 is operated by a hydraulic or pneumatic ram 60 which is mounted above the channel member 55 between a bracket 61 fixed to the channel member 57 and a vertical extension 62 of the carrier 57. The track rod parts are each pivotally mounted at one end to the apertures 59, and at the other end to respective track arms 64 at a respective pivot 65. An imaginary line connecting the pivots 65 is hereafter referred to as the "centre line".

The carrier 57 is slidable horizontally in the channel member 55 to carry the arm 58 between a first position 66 in which the apertures 59 are disposed at a predetermined distance d behind the "centre line" and a second position 67 in which the apertures 59 are disposed the same distance d in front of the "centre line". The sliding movement between the first and second positions is operated by the activation of the ram 60.

For forward travel of the trailer with the arm in the first position 66 the steering linkages including the divided track rod move the forward trailer wheels to take up a position which allows the trailer wheels to track the towing vehicle. For reversing the trailer the track rod carrier arm 58 is moved to its second position 67 by operating the ram 60. With the arm 58 in this second position 67 the effect of rotation of the steering arm on the movement of the wheels is reversed so that the wheels are moved to take up a position opposed to that taken up with the arm in the first position 66. Thus the trailer is more easily reversed. The adjustment of the arm 58 will preferably be made automatically by engagement of the reverse gear in the towing vehicle. This way it is not possible to be in the wrong position of the arm for forward or reverse movement of the trailer. Thus for forward movement of the trailer the forward trailer wheels turn in the opposite direction to those of the towing vehicle, while for reverse movement of the trailer the forward trailer wheels are turned in the same direction as those of the towing vehicle.

It is preferable for the "centre line" to be vertically underneath the axis of the hinge 52 so that the axis and the "centre line" are in the same vertical plane. This ensures that the angle that the wheel turns in the forward and reverse positions is the same, but opposed, for the same angular movement of the steering arm. This is also the best arrangement to minimize the tire wear. Positioning the bracket 38 and hinge 52 behind the "centre line" will result in a reduced arc of steering in forward travel with an increase in steering in reverse. The opposite effect can be achieved by positioning the attachment of the bracket 38 and hinge 52 forwards of the "centre line".

It will be appreciated that it is possible to provide a lock on the carrier arm 58 to fix it in at least the position 67 (and optionally additionally the position 66) so that, in the event of a gas (air) or oil leak, the position of the arm 58 is not altered.

Where it is required to incorporate a driven axle it may be necessary to provide respective rams 60 for each of the two forward wheels.

I claim:

1. A multiple axle trailer comprising
   a sub-chassis fitted with at least first and second axles,
   a chassis supported on the sub-chassis to pivot relative to the sub-chassis and provided with means at its forward end to enable the trailer to be pivotally mounted to a towing vehicle, a pair of wheels on each of said at least first and second axles, the pair of wheels on the first axle able to turn with respect to the first axle about respective pivot points,
   said trailer including
   a steering arm pivotally connected to the sub-chassis at a first pivot, and to the chassis at a second pivot, and connected to pivot relative to the sub-chassis when the chassis is caused to pivot relative to the sub-chassis, the length of the steering arm being adjustable to compensate for changes in the distance between the first and second pivots during operation;
   a mounting point movable with the steering arm, a respective pivot point associated with each of the wheels of said first axle,
   and a system of linkages connected between the pivot point of each wheel of said first axle and the mounting point, the linkages being connected to steer the wheels of the first axle in response to the pivotal position of the steering arm relative to the sub-chassis.

2. A multiple axle trailer according to claim 1 in which the sub-chassis comprises the lower part of a turntable and the chassis includes the upper part of the turntable, the pivot point connecting the two parts of the turntable being located substantially centrally over said at least first and second axles.

3. A multiple axle trailer according to claim 1 in which the said mounting point is adjustable relative to the steering arm both to a first position in which the linkages move the wheels of the first axle in one direction as a result of the pivotal movement of the steering arm and to a second position in which the linkages move the said wheels in the opposite direction as a result of the same pivotal movement of the steering arm.

4. A multiple axle trailer according to claim 3 in which the mounting point is slidably mounted with respect to a support, the support being fixed to pivot with the steering arm, the support and the steering arm being mounted for pivotal movement with respect to the sub-chassis about a substantially vertical axis.

5. A multiple axle trailer according to claim 4 in which the support is fixed to the steering arm via a pin and the steering arm is pivotally mounted to the said pin about a substantially horizontal axis.

6. A multiple axle trailer according to claim 3 in which the linkages include a track arm and a track rod for each wheel of the first axle, each track rod having a first end pivotally mounted to the said mounting point and a second end pivotally mounted to its respective track arm.

7. A multiple axle trailer according to claim 3 in which a lower part of the turntable is square or rhombus shaped with two opposed corners positioned longitudinally of the trailer.

8. A multiple axle trailer according to claim 3 in which a second axle carries a pair of wheels mounted to turn with respect to the second axle and means is provided to steer the wheels of the second axle from a steering arm pivotally connected between the chassis and the sub-chassis.

9. A multiple axle trailer according to claim 1 in which the system of linkages include a track arm and a track rod for at least one wheel of the first axle, said track rod having a first end pivotally mounted to the said mounting point and a second end pivotally mounted to its respective track arm.

10. A multiple axle trailer according to claim 9 in which the mounting point is moveable longitudinally of the steering arm between a position in front of a line joining the track rod second ends and a position behind the said line.

11. A multiple axle trailer according to claim 10 in which the mounting point is slidably mounted with respect to a support, the support being fixed to pivot with the steering arm, the support and the steering arm being mounted for pivotal movement with respect to the sub-chassis about a substantially vertical axis.

12. A multiple axle trailer according to claim 1 in which a lower part of the turntable is square or rhombus shaped with two opposed corners positioned longitudinally of the trailer.

13. A multiple axle trailer according to claim 1 in which the wheels of the second axle are mounted to turn with respect to the second axle and means is provided to steer the wheels of the second axle from a steering arm pivotally connected between the chassis and the sub-chassis.

14. A multiple axle trailer according to claim 13 in which the second axle is steered from a steering arm connected between the sub-chassis and a pivot point on the chassis to the rear of the sub-chassis.

* * * * *